United States Patent
Nayak et al.

(10) Patent No.: US 8,683,250 B2
(45) Date of Patent: Mar. 25, 2014

(54) MINIMIZING STORAGE POWER CONSUMPTION

(75) Inventors: Tapan K. Nayak, New Delhi (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 12/491,495

(22) Filed: Jun. 25, 2009

(65) Prior Publication Data

US 2010/0332882 A1    Dec. 30, 2010

(51) Int. Cl.
*G06F 1/00* (2006.01)

(52) U.S. Cl.
USPC .......................................................... 713/324

(58) Field of Classification Search
USPC .......................................................... 713/324
See application file for complete search history.

(56) References Cited

U.S. PATENT DOCUMENTS

| | | | |
|---|---|---|---|
| 6,904,599 B1 | 6/2005 | Cabrera et al. | |
| 2007/0143542 A1* | 6/2007 | Watanabe et al. | 711/114 |
| 2008/0263278 A1* | 10/2008 | Shen et al. | 711/118 |
| 2008/0313482 A1* | 12/2008 | Karlapalem et al. | 713/324 |
| 2009/0055507 A1* | 2/2009 | Oeda | 709/216 |
| 2009/0249018 A1* | 10/2009 | Nojima et al. | 711/170 |
| 2009/0300605 A1* | 12/2009 | Edwards et al. | 718/1 |
| 2010/0191997 A1* | 7/2010 | Dodeja et al. | 713/323 |
| 2010/0218013 A1* | 8/2010 | Gill et al. | 713/320 |
| 2010/0299547 A1* | 11/2010 | Saika | 713/324 |

OTHER PUBLICATIONS

Narayanan et al., Write Off-Loading: Practical Power Management for Enterprise Storage (FAST '08).
Gurumurthi, Power Management of Enterprise Storage Systems (Thesis '05).
Weddle et al., PARAID: A Gear-Shifting Power-Aware RAID (FAST '07).

* cited by examiner

Primary Examiner — Nimesh G Patel
(74) Attorney, Agent, or Firm — Ryan, Mason & Lewis, LLP

(57) ABSTRACT

Techniques for minimizing storage power consumption are provided. The techniques include generating one or more physical storage volumes and one virtual storage volume for each physical storage volume, creating a mapping from virtual storage volumes to physical storage volumes, determining input/output (I/O) access behavior of one or more applications using statistical analysis, and re-mapping the virtual to physical volume mapping based on the determined I/O access behavior of the one or more applications to minimize storage power consumption while meeting a required performance.

20 Claims, 4 Drawing Sheets

MINIMIZING STORAGE POWER CONSUMPTION

FIELD OF THE INVENTION

Embodiments of the invention generally relate to information technology, and, more particularly, to storage power consumption.

BACKGROUND OF THE INVENTION

The growth of enterprises and the emergence of the Internet have lead to exponential data growth. Considerable resources are being spent on energy in connection with increasing computer hardware costs. Data centers consume several Megawatts of power at considerable expense per year, and storage is another large consumer of energy within a data center along with server and cooling. Designing power aware systems for data centers is a major challenge for the information technology (IT) industry.

SUMMARY OF THE INVENTION

Principles and embodiments of the invention provide techniques for minimizing storage power consumption. An exemplary method (which may be computer-implemented) for minimizing storage power consumption, according to one aspect of the invention, can include steps of generating one or more physical storage volumes and one virtual storage volume for each physical storage volume, creating a mapping from virtual storage volumes to physical storage volumes, determining input/output (I/O) access behavior of one or more applications using statistical analysis, and re-mapping the virtual to physical volume mapping based on the determined I/O access behavior of the one or more applications to minimize storage power consumption while meeting a required performance.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
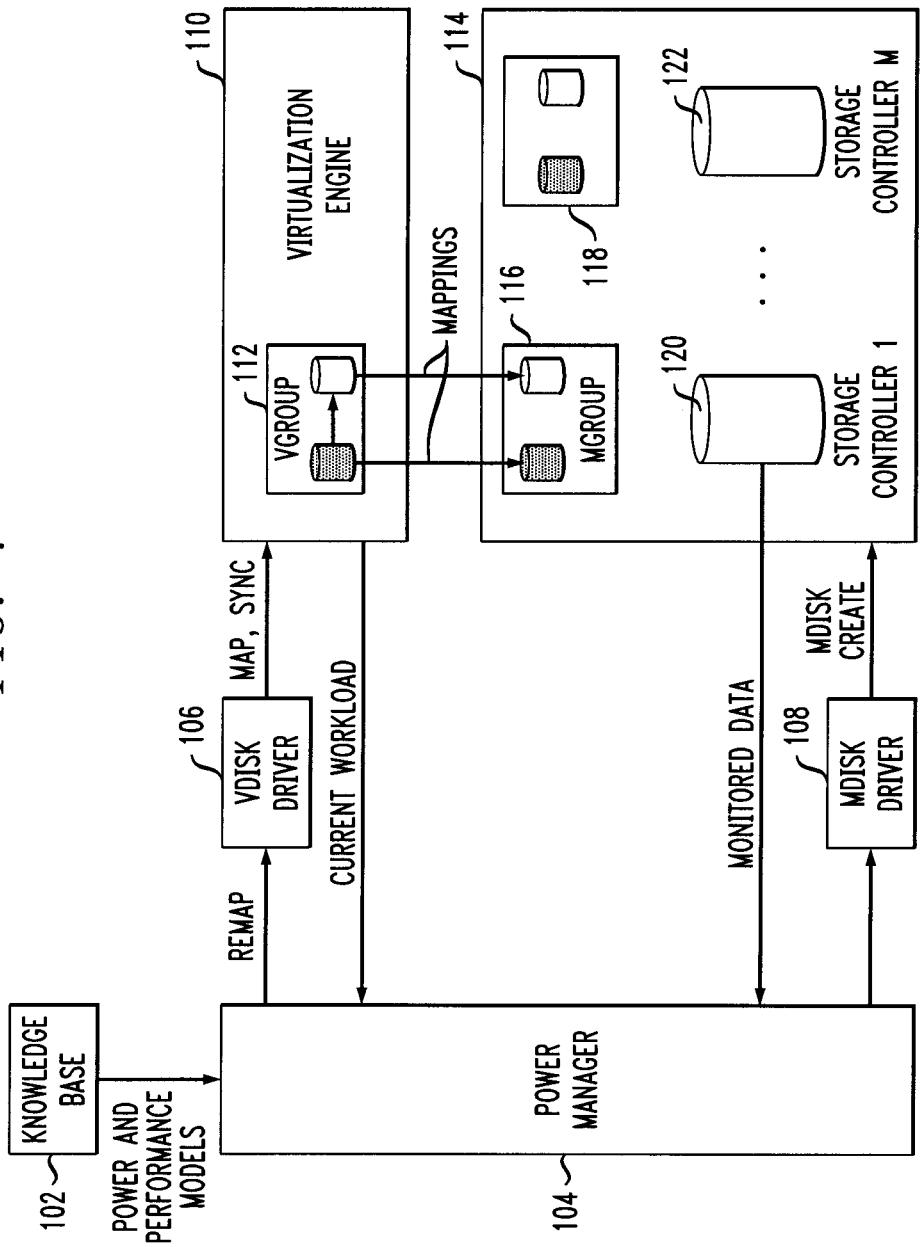
FIG. 1 is a diagram illustrating power management architecture, according to an embodiment of the invention.

Principles of the invention include dynamic mapping of workload to minimize power consumption in virtualized storage. One or more embodiments of the invention include dynamic configuration of storage volumes and/or storage disks based on application input/output (I/O) workload characteristics so as to reduce storage power consumption while satisfying application requirements.

As noted herein, storage workloads have huge dynamic variations and planning based on peak workloads can lead to high power consumption. Also, data migration is a highly expensive task and power management based on moving the complete data around is infeasible. Further, power management based on data migration should be transparent to the applications. As such, one or more embodiments of the invention include using virtualization for power management without data migration, where virtual-to-physical mappings are migrated instead of data, so as to make it transparent to the user. Additionally, heterogeneous storage can be used for power management transparently to the applications without changing the existing storage systems.

Storage virtualization allows one to transparently shift workload from one physical device and/or disk to another, while the cost of data migration can be minimized if virtualization mappings are migrated instead of actual data. Further, multiple physical volumes can be created at different performance-power values, and mechanisms such as, for example, flashcopy, enable synchronization of only the changed data between storage volumes.

As described herein, one or more embodiments of the invention include architecture and techniques for dynamic configuration of storage volumes and/or disks based on application I/O workload characteristics so as to reduce storage power consumption while satisfying application requirements. The techniques detailed herein can include, for example, a pre-processing phase that can, for the same workload, create multiple physical volumes or repository to handle different workload intensities. Also, the storage access (read/write) pattern of an application or a group of applications can be collected over a long period of time, and the I/O access behavior as a function of time can be predicted.

Additionally, one or more embodiments of the invention include re-configuring the storage locations based on predicted I/O access pattern so as to reduce storage power consumption by switching off some storage disks for certain periods of time. Further, the techniques detailed herein can maintain data consistency during change in configuration by tracking the changes in the current configuration as well as synchronizing the changes in the new configuration.

As such, for the same data, one or more embodiments of the invention can create multiple physical volumes having different performance and power levels, remap a virtual volume to a physical volume based on the predicted I/O access behavior of the application(s) and a power-performance criteria, and synchronize data across the multiple physical volumes upon a remapping of the virtual volume.

In contrast to the disadvantages of existing approaches, the techniques described herein include power management without expensive data migration by using storage virtualization, wherein the virtualization mappings are migrated instead of actual data. Additionally, one or more embodiments of the invention handle heterogeneous storage devices without any change in existing systems, are transparent to the user, can operate without additional storage, and can have multiple performance levels.

By way of example and not limitation, one or more embodiments of the invention can be implemented in a number of exemplary scenarios. For instance, the techniques described herein can be implemented with respect to high speed disks for day-time and low speed disks for night-time. Additionally, one or more embodiments of the invention can be implemented in architectures such as, for example, RAID 10 for day-time and RAID 4 for night-time (requires only one 1 additional disk per RAID array), as well as, for instance, RAID 10 for day-time and RAID 0 for night-time (no additional space required).

RAID 10 is a mirrored set of striped disks requiring about double number of disks than required to host the data. Hence, it provides fault tolerance as well as high performance, but consumes more power. On the other hand, a RAID 4 combination stripes the data over only the required disks and uses one additional disk to store the parity (RAID 0 requires exactly half, as the parity disk is not required) and consumes much less power compared to a RAID 10 combination but provides reduced performance. Thus, a RAID 10 combination may be ideal for day time to support a more intense workload and the RAID 4 or RAID 0 are sufficient for the low-intensity night-time workload.

FIG. 1 is a diagram illustrating power management architecture, according to an embodiment of the invention. By way of illustration, FIG. 1 depicts a knowledge base 102, which provides power and performance models to a power manager 104. The overall power management flow includes an initial managed disk (MDisk) creation and run-time power management.

In the initial MDisk creation flow, the power manager 104 uses the workload intensity distribution to decide the number of managed disk volumes required in order to serve the workload at different periods in time. For example, the power manager 104 may detect a diurnal distribution with high load during day-time and low load during night-time. Hence, it decides to create two set of MDisks: a primary MDisk with high power and high performance and one or more secondary MDisks with low power and low performance. All of these MDisks are defined to be a part of a managed group (MGroup).

The power manager 104 uses the MDisk Driver 108 to create the required sets of MDisks and the MGroup. In one or more embodiments of the invention, the MDisk creation is performed sparingly (for example, once a month). At the same time, the power manager 104 uses a virtual disk (VDisk) driver 106 to also create a set of VDisks, one per MDisk and mapped to the MDisk, that are accessible to the user. As referred to herein, the mapping from VDisks to MDisks as a mapping and these set of VDisks as a virtual group (or VGroup). Also, all of the secondary VDisks (corresponding to the secondary MDisks) in a VGroup are synchronized with the primary VDisk.

The run-time power management flow can be performed periodically (for example, once per hour). During real-time operation, when the power manager detects a change in workload, it can decide to switch the workload from the primary MDisk to one of the secondary MDisks. This is performed by changing the VDisk to MDisk mapping. As such, the workload that was coming to a primary MDisk may now go to one of the secondary MDisks through this remapping. Hence, the mapping from the VDisks to MDisks is changed and provided to the VDisk driver, which implements the required remapping.

Figure 2:
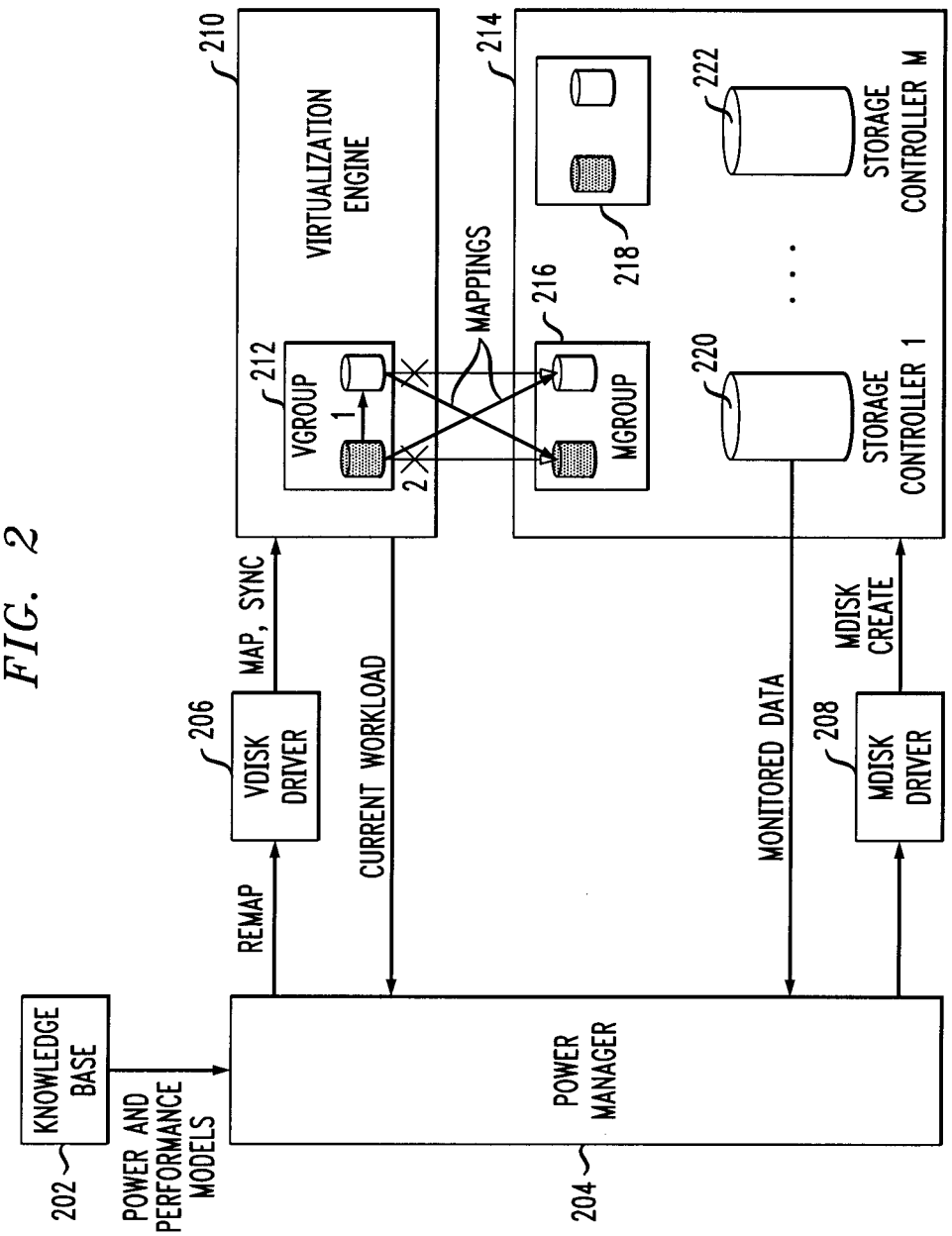
FIG. 2 is a diagram illustrating a high demand to low demand use case, according to an embodiment of the invention.

By way of illustration, an example of a remapping is provided in FIG. 2. In this example, the first flow (MDisk creation flow) creates the MDisks and a mapping for normal day-time operation. In the second flow, it is detected that the workload has reduced and the VDisks are re-mapped to MDisks mapping.

As additionally depicted in FIG. 1, VDisk driver 106 provides map synchronization to a virtualization engine 110, which includes a VGroup 112. MDisk driver 108 provides a created MDisk to component 114, which includes MGroup 116, group 118, storage controller 1 (120) and storage controller M 122.

Further, as depicted by FIG. 1, VGroup 112 provide mappings to MGroup 116, virtualization engine 110 provides a current workload to power manager 104 and storage controller 120 provides monitored data to power manager 104.

FIG. 2 is a diagram illustrating a high demand to low demand use case, according to an embodiment of the invention. By way of illustration, FIG. 2 depicts a knowledge base 202, which provides power and performance models to a power manager 204. The power manager 204 provides input (in the form of a remap) to VDisk driver 206, and also provides input to MDisk driver 208. VDisk driver 206 provides map synchronization to a virtualization engine 210, which includes a VGroup 212. MDisk driver 208 provides a created MDisk to component 214, which includes MGroup 216, group 218, storage controller 1 (220) and storage controller M 222.

VGroup 212 provide mappings to MGroup 216, virtualization engine 210 provides a current workload to power manager 204 and storage controller 220 provides monitored data to power manager 204.

Figure 3:
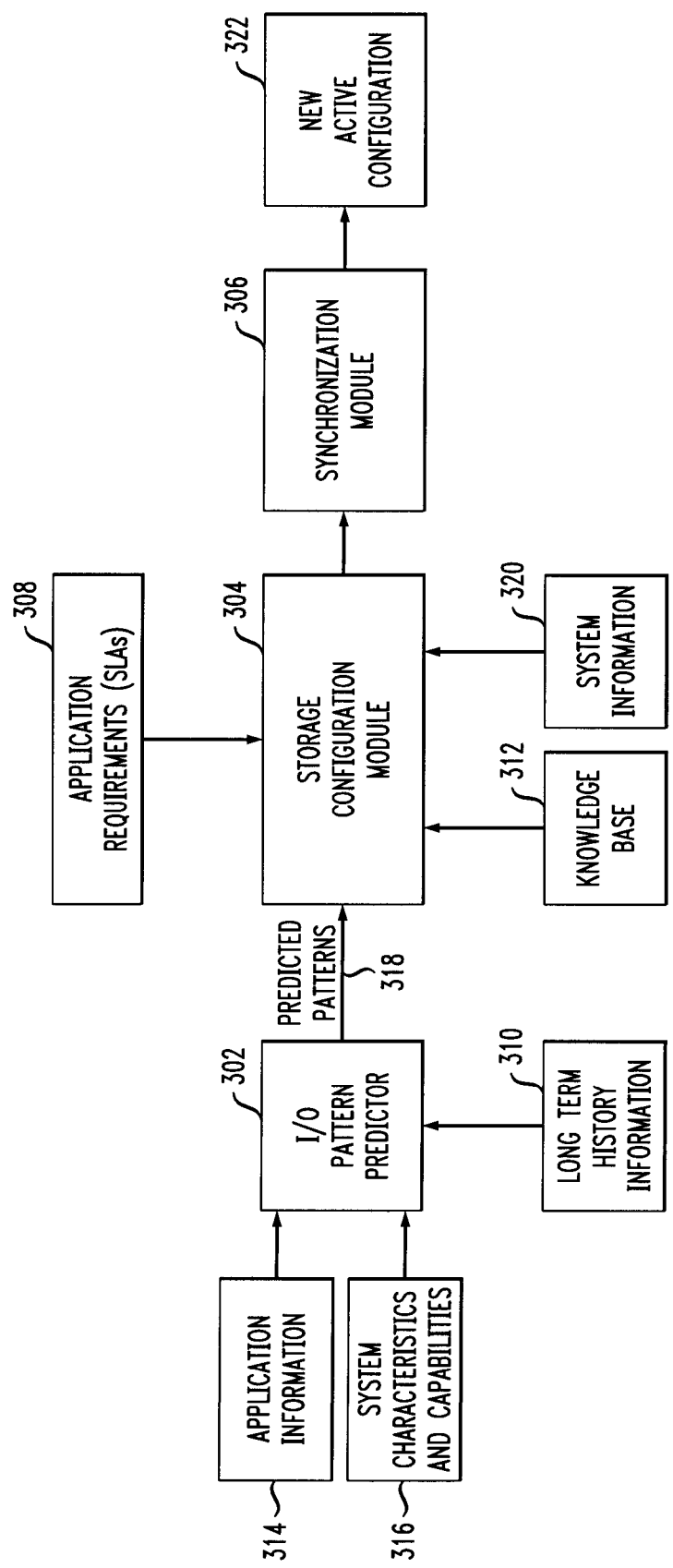
FIG. 3 is a diagram illustrating power manager architecture, according to an embodiment of the invention.

FIG. 3 is a diagram illustrating power manager architecture, according to an embodiment of the invention. By way of illustration, FIG. 3 depicts an input/output (I/O) pattern predictor 302, a storage configuration module 304, and a synchronization module 306. As depicted by FIG. 3, application information 314 and system characteristics, capabilities 316, and long-term history information 310 are provided to the I/O pattern predictor 302, which provides predicted patterns 318 to the storage configuration module 304. Also provided to the storage configuration module are application requirements (for example, service level agreements (SLAs)) 308, a knowledge base 312 and system information 320.

Additionally, the storage configuration module 304 decides the change in active configurations and instructs the synchronization module 306 to re-establish the synchronization between the new set of source and target volumes, which generates a new active configuration 322.

Figure 4:
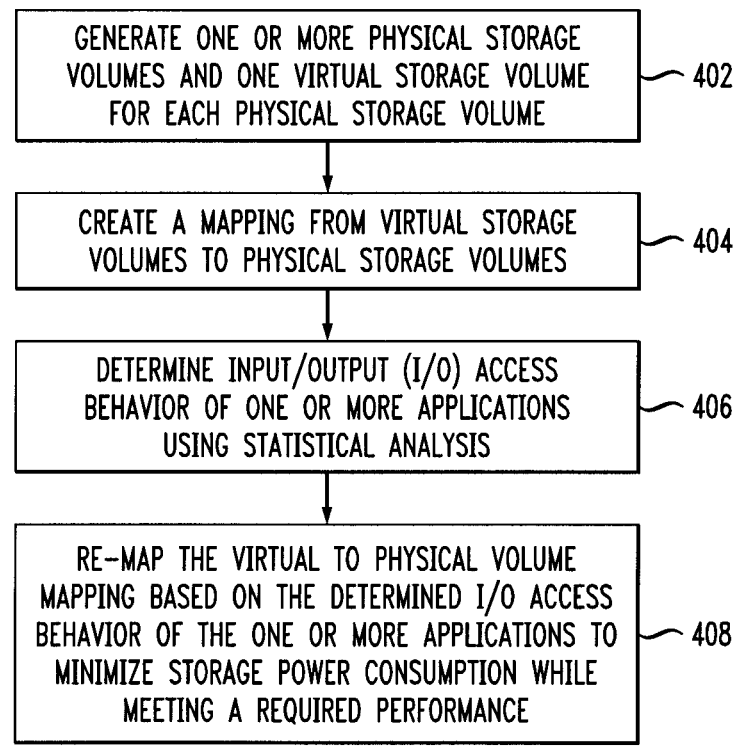
FIG. 4 is a flow diagram illustrating techniques for minimizing storage power consumption, according to an embodiment of the invention.

FIG. 4 is a flow diagram illustrating techniques for minimizing storage power consumption, according to an embodiment of the present invention. Step 402 includes generating one or more physical storage volumes and one virtual storage volume for each physical storage volume. This step can be carried out, for example, using a power manager module. The power manager configures the MDisk and VDisk drivers to create the appropriate set of physical and logical volumes. The physical storage volumes can be heterogeneous (that is, different type of disks or different number of disks or managed by different kinds of storage controllers). Generating physical storage volumes can include, for example, generating physical storage volumes having different performance and power levels.

Step 404 includes creating a mapping from virtual storage volumes to physical storage volumes. Step 406 includes determining input/output (I/O) access behavior of one or more applications (for example, as a function of time) using statistical analysis. This step can be carried out, for example, using an I/O pattern predictor module.

Step 408 includes re-mapping the virtual to physical volume mapping based on the determined I/O access behavior of the one or more applications (as well as, for example, a power-performance criteria) to minimize storage power consumption while meeting a required performance without expensive data migration. This step can be carried out, for example, using a storage configuration module. Re-mapping the virtual to physical volume mapping based on the determined I/O access behavior of the one or more applications can include switching off one or more storage disks for periods of time.

As detailed herein, the techniques depicted in FIG. 4 include avoiding data migration while performing power management, as well as leveraging heterogeneous storage to achieve maximal power savings. The techniques depicted by FIG. 4 can also include collecting a storage access (read/write) pattern of an application and/or collecting a storage access (read/write) pattern of a group of applications over a period of time.

One or more embodiments of the invention additionally include maintaining data consistency during re-mapping, which can include tracking each of one or more changes in a current mapping as well as synchronizing each of the changes in a new mapping. Synchronizing each of the changes in a new mapping can include, for example, synchronizing data across one or more physical volumes upon a re-mapping of a virtual storage volume.

The techniques depicted in FIG. 4 can also, as described herein, be run on a system, wherein the system includes distinct software modules, each of the distinct software modules being embodied on a tangible computer-readable recordable storage medium. The distinct software modules can include, for example, an I/O pattern predictor module, a storage configuration module, a synchronization module, a power manager module and a storage virtualization engine module executing on a hardware processor.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 5:
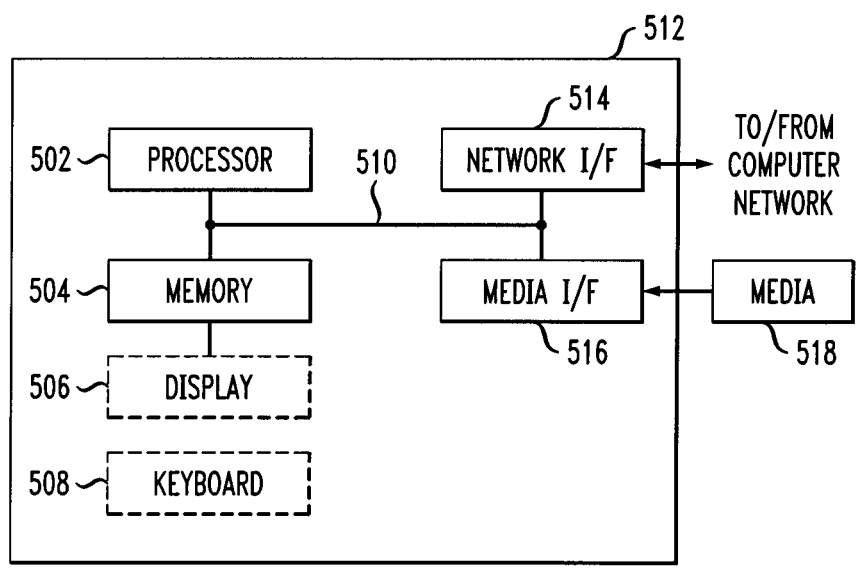
FIG. 5 is a system diagram of an exemplary computer system on which at least one embodiment of the invention can be implemented.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction implementation system. For the purposes of this description, a computer usable or computer readable medium can be any apparatus for use by or in connection with the instruction implementation system, apparatus, or device. The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 504), magnetic tape, a removable computer diskette (for example media 518), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or implementing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIGS. 1-3. The method steps can then be carried out using the distinct software modules and/or sub-modules of the system, as described above, executing on a hardware processor. Further, a computer program product can include a tangible computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, power management without expensive data migration via the use of storage virtualization.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for minimizing storage power consumption, wherein the method comprises:

generating, for an application, multiple physical storage volumes of different power specifications associated with a virtual storage volume:

creating a mapping from the virtual storage volume to a first physical storage volume of the multiple physical storage volumes;

determining input/output (I/O) access behavior of the application using statistical analysis; and dynamically migrating the mapping between the virtual storage volume and the first physical storage volume to between the virtual storage volume and a second physical storage volume of the multiple physical storage volumes and switching off one or more of the multiple physical storage volumes for a period of time based on the determined I/O access behavior of the application to minimize storage power consumption while meeting a required performance.

2. The method of claim 1, wherein the multiple physical storage volumes are heterogeneous.

3. The method of claim 1, wherein generating multiple physical storage volumes comprises generating one or more physical storage volumes having different performance and power levels.

4. The method of claim 1, wherein said switching off one or more of the multiple physical storage volumes for a period of time based on the determined I/O access behavior of the application comprises switching off one or more storage disks for one or more periods of time.

5. The method of claim 1, further comprising collecting a storage access pattern of an application.

6. The method of claim 1, further comprising collecting a storage access pattern of a group of two or more applications over a period of time.

7. The method of claim 1, further comprising maintaining data consistency during said migrating.

8. The method of claim 7, wherein maintaining data consistency during said migrating comprises tracking each of one or more changes in a current mapping.

9. The method of claim 8, wherein maintaining data consistency during said migrating comprises synchronizing each of the one or more changes in a new mapping.

10. The method of claim 9, wherein synchronizing each of the one or more changes in a new mapping comprises synchronizing data across one or more physical storage volumes upon migrating a virtual storage volume mapping.

11. The method of claim 1, wherein the method is run on a system, wherein the system comprises one or more distinct software modules, each of the one or more distinct software modules being embodied on a tangible computer-readable recordable storage medium, and wherein the one or more distinct software modules comprise an I/O pattern predictor module, a storage configuration module, a synchronization module, a power manager module and a storage virtualization engine module executing on a hardware processor.

12. A computer program product comprising a tangible computer readable recordable storage medium including computer useable program code for minimizing storage power consumption, the computer program product including:

computer useable program code for generating, for an application, multiple physical storage volumes of different power specifications associated with a virtual storage volume;

computer useable program code for creating a mapping from the virtual storage volume to a first physical storage volume of the multiple physical storage volumes;

computer useable program code for determining input/output (I/O) access behavior of the application using statistical analysis; and computer useable program code for dynamically migrating the mapping between the virtual storage volume and the first physical storage volume to between the virtual storage volume and a second physical storage volume of the multiple physical storage volumes and switching off one or more of the multiple physical storage volumes for a period of time based on the determined I/O access behavior of the application to minimize storage power consumption while meeting a required performance.

13. The computer program product of claim 12, wherein the multiple physical storage volumes are heterogeneous.

14. The computer program product of claim 12, further comprising:

computer useable program code for maintaining data consistency during said migrating, wherein the computer useable program code for maintaining data consistency during said migrating comprises computer useable program code for tracking each of one or more changes in a current mapping and computer useable program code for synchronizing each of the one or more changes in a new mapping.

15. The computer program product of claim 14, wherein the computer useable program code for synchronizing each of the one or more changes in a new mapping comprises computer useable program code for synchronizing data across one or more physical storage volumes upon a migration of a virtual storage volume mapping.

16. The computer program product of claim 12, wherein the computer usable program code comprises one or more distinct software modules, and wherein the one or more distinct software modules comprise an I/O pattern predictor module, a storage configuration module, a synchronization module, a power manager module and a storage virtualization engine module executing on a hardware processor.

17. A system for minimizing storage power consumption, comprising:

a memory; and at least one processor coupled to the memory and operative to:

generate, for an application, multiple physical storage volumes of different power specifications associated with a virtual storage volume;

create a mapping from the virtual storage volume to a first physical storage volume of the multiple physical storage volumes;

determine input/output (I/O) access behavior of the application using statistical analysis; and dynamically migrate the mapping between the virtual storage volume and the first physical storage volume to between the virtual storage volume and a second physical storage volume of the multiple physical storage volumes and switch off one or more of the multiple physical storage volumes for a period of time based on the determined I/O access behavior of the application to minimize storage power consumption while meeting a required performance.

18. The system of claim 17, wherein the multiple physical storage volumes are heterogeneous.

19. The system of claim 17, wherein the at least one processor coupled to the memory is further operative to:

maintain data consistency during said migration, wherein maintaining data consistency during said migration comprises tracking each of one or more changes in a current mapping and synchronizing each of the one or more changes in a new mapping.

20. The system of claim 17, further comprising a tangible computer-readable recordable storage medium having one or more distinct software modules embodied thereon, the one or more distinct software modules comprising an I/O pattern predictor module, a storage configuration module, a synchronization module, a power manager module and a storage virtualization engine module executing on a hardware processor.

* * * * *